United States Patent [19]

Birchler et al.

[11] Patent Number: 5,638,403

[45] Date of Patent: Jun. 10, 1997

[54] LOW-SPLATTER PEAK-TO-AVERAGE SIGNAL REDUCTION WITH INTERPOLATION

[75] Inventors: Mark A. Birchler, Roselle; Steven C. Jasper, Hoffman Estates; Alek Tziortzis, Skokie, all of Ill.

[73] Assignee: Motorola, Inc., Shaumburg, Ill.

[21] Appl. No.: 430,969

[22] Filed: Apr. 28, 1995

[51] Int. Cl.$^6$ .................................................. H04L 25/49
[52] U.S. Cl. .................................. 375/296; 332/159
[58] Field of Search ........................... 375/296, 295; 332/107, 123, 159; 455/50.1, 52.1, 52.3, 63, 67.3, 114; 364/723

[56] References Cited

U.S. PATENT DOCUMENTS

4,780,673  10/1988  Hill ........................................... 324/307
5,287,387   2/1994  Birchler ..................................... 375/60

Primary Examiner—Stephen Chin
Assistant Examiner—Kevin Kim
Attorney, Agent, or Firm—Susan L. Lukasik

[57] ABSTRACT

A method of low-splatter peak-to-average reduction for a linear communication system includes the step of sampling (1201) an input signal at a first rate, yielding a plurality of input samples. When at least one (1401, 1403, and 1405) of the plurality of input samples is above a first threshold, a local maximum (1401) is determined (1207) from among the plurality of input samples. At least one value (1407 and 1409) is interpolated (1207) between the local maximum and at least one sample (1405) adjacent to the local maximum. The at least one value and the local maximum are compared (1211) to determine which has the highest magnitude. The value having the highest magnitude (1407) is compared (1213) to a second threshold. When the value having the highest magnitude (1407) is above the second threshold, an attenuating window is centered (1505) at the value having the highest magnitude and applying (1507) the attenuating window to at least some of the plurality of input samples.

20 Claims, 6 Drawing Sheets

LOW-SPLATTER PEAK-TO-AVERAGE SIGNAL REDUCTION WITH INTERPOLATION

FIELD OF THE INVENTION

This invention relates to clipping of signals transmitted on radio frequencies (RF), including but not limited to clipping with low RF splatter.

BACKGROUND OF THE INVENTION

In a linear radio communication system, the peak-to-average ratio (i.e., the ratio of the signal envelope peak power to the average power of the signal) of a communication signal is of critical importance to the cost, complexity, and size of the radio's linear power amplification system. Seemingly small reductions in peak-to-average ratio can have a significant impact on each of the above-mentioned system characteristics.

A problem in the design of linear power amplifiers is the effect of the transmitted signal's peak-to-average ratio on performance. As the peak-to-average ratio (PAR) increases, the back-off needed for adequate splatter performance of the power amplifier increases proportionally. Therefore, it is highly desirable to control the PAR of the signal input to the amplifier. However, any attempt to reduce the nominal PAR through other than linear processing functions (i.e., non-linear signal processing) generates splatter. Splatter, which is signal energy that extends beyond the frequency band allocated to a signal, is highly undesirable because it interferes with communications on adjacent channels.

One method of reducing PAR is hard clipping, which reduces each signal value exceeding a clip threshold to a predetermined magnitude, often the threshold magnitude. Hard-clipping causes significant splatter due to the abrupt nature of its operation.

Another method of reducing PAR is a "soft" algorithm that applies the desired signal to a non-linear device that limits signal peaks. A significant proportion of the input samples must be altered, causing significant energy to be splattered into adjacent channels.

A method of reducing PAR that does not generate significant splatter is described in U.S. Pat. No. 5,287,387, titled "LOW SPLATTER PEAK-TO-AVERAGE SIGNAL REDUCTION" and issued on Feb. 15, 1994 to Mark Birchler with the same assignee as the present invention.

The following describes the apparatus for and method of effective PAR control without the generation of significant splatter described in U.S. Pat. No. 5,287,387. The method involves a windowed-clipping algorithm that provides a low-splatter mechanism of reducing signal peaks by applying an attenuating window, such as an inverse Hanning window, to a limited number of signal samples centered at the peak of a signal above a clip threshold.

Figure 1:
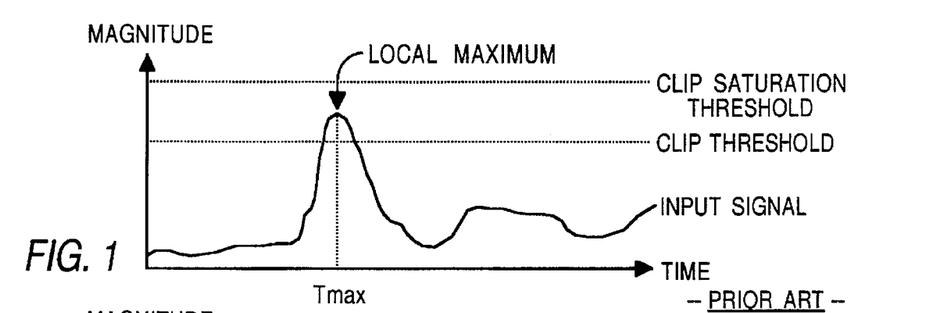
FIG. 1 is a timing diagram of an input signal as is known in the art.
Figure 2:
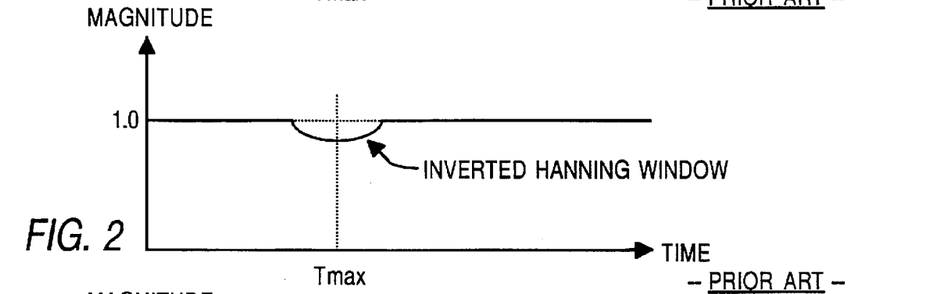
FIG. 2 is a timing diagram of an inverted Hanning window as is known in the art.
Figure 3:
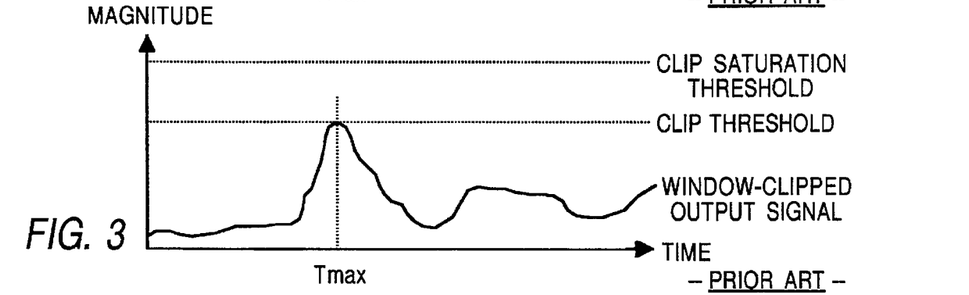
FIG. 3 is a timing diagram of the input signal of FIG. 1 after windowed clipping is performed as is known in the art.

A timing diagram of an input signal having a local maximum at time Tmax above a predetermined clip threshold is shown in FIG. 1. Because any signal value above the clip threshold causes a power amplifier to operate in its non-linear region, resulting in splatter, the maximum signal input to the power amplifier is clipped to the clip threshold. A timing diagram of an inverted Hanning window centered at time Tmax, the time of the local maximum of the input signal, is shown in FIG. 2. After applying the inverted Hanning window to the input signal, the resultant signal is shown in the timing diagram of FIG. 3. Note that the signal values above the clip threshold have been attenuated to be no larger than the clip threshold, thus preventing the power amplifier from entering non-linear operation and causing splatter. This process will be referred to as windowed clipping or the windowed-clipping algorithm in this application.

Figure 4:
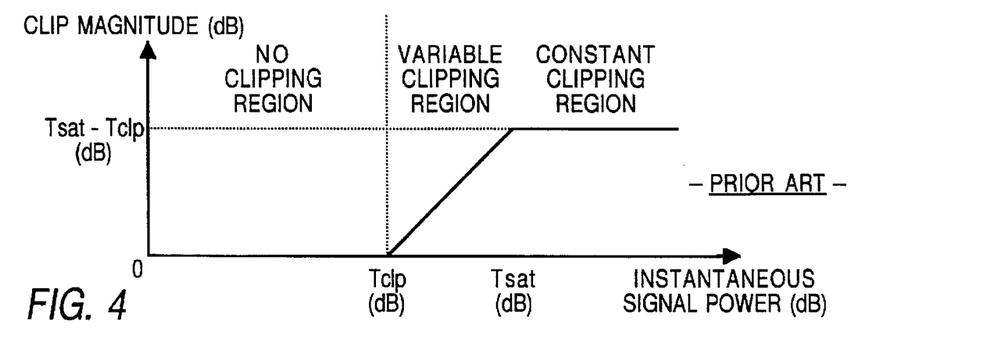
FIG. 4 is a diagram of clip magnitude versus instantaneous signal power as is known in the art.

A diagram of clip magnitude versus instantaneous signal power is shown in FIG. 4. No clipping occurs when the instantaneous signal power is below Tclp, where Tclp is the predetermined clip threshold power level as well as the maximum allowed peak signal power value that does not trigger the windowed-clipping algorithm. Variable clipping occurs when the instantaneous signal power is above Tclp and below Tsat, the predetermined clip saturation threshold power level. Constant clipping occurs when the instantaneous signal power is above Tsat.

Figure 5:
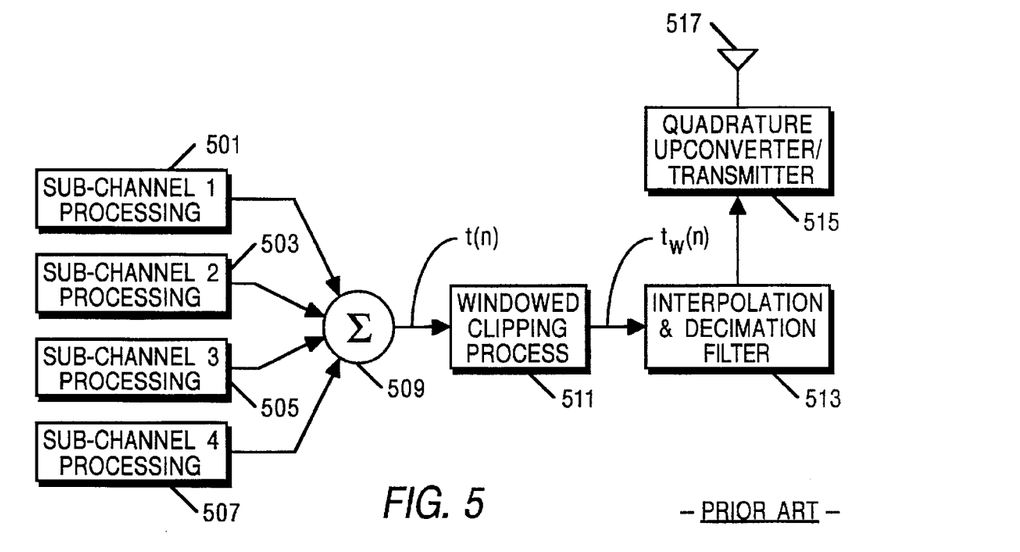
FIG. 5 is a block diagram of a transmitter with windowed clipping as is known in the art.

A block diagram of a transmitter with windowed clipping is shown in FIG. 5. Although a Quad-16QAM signal is transmitted in the preferred embodiment of U.S. Pat. No. 5,287,387, the windowed-clipping procedure will function successfully on other signal types. Outputs from four Quad-16QAM sub-channel processors 501, 503, 505, and 507 are combined in a summer 509. The signal t(n) is the complex-valued signal stream at the output of the Quad-16QAM transmit sub-channel summer 509. The signal t(n) is input to the windowed-clipping process block 511, which outputs a window-clipped signal $t_w(n)$ to an interpolation and decimation filter 513, the output of which is fed into a quadrature upconverter/transmitter 515 for transmission of the signal in a predetermined fashion, e.g., Quad-16QAM, through an antenna 517.

Figure 6:
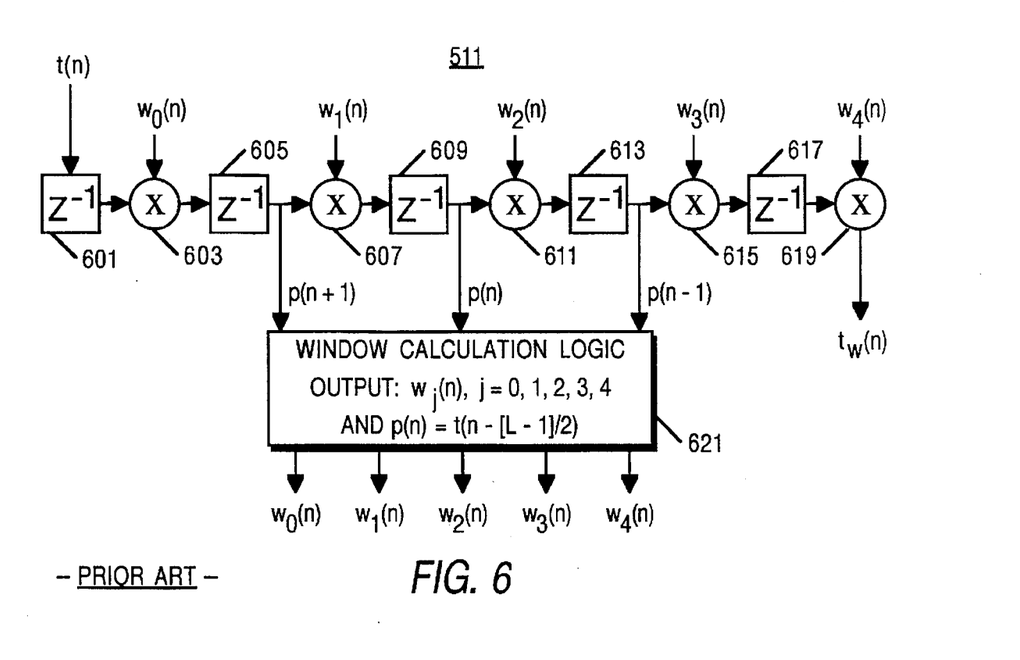
FIG. 6 is a block diagram showing a windowed clipping algorithm as is known in the art.

A block diagram showing a windowed-clipping algorithm is shown in FIG. 6. Although a window will typically be of length 9, 11, or 13, a length L=5 window is shown to minimize complexity of the drawings, where a length L window means that there are L stages of delay and L samples that are modified by the windowed-clipping process. The windowed-clipping algorithm is triggered by a local maximum sample value that exceeds Tclp. The three center elements of the delay line, p(n), p(n−1), and p(n+1), are used to check for algorithm triggering, where p(n)=t(n−[L−1]/2), which is a complex quantity. If $|p(n)|^2$ is less than Tclp, then no further logic is required, i.e., no clipping is necessary.

The input signal to the windowed-clipping process is t(n). The first stage of the process is a first one-sample delay stage 601. The output of this first delay 601 is combined with $w_0(n)$ in a first multiplier 603. The output of the first multiplier 603 is input to a second one-sample delay stage 605. The output of the second delay 605 is designated p(n+1), and is input to a second multiplier 607 and a window calculation logic block 621. The window calculation logic block 621 determines the values of the attenuating window, $w_0(n), w_1(n), \ldots, w_{L-1}(n)$, based on triggers and calculations described below. The sample p(n+1) is multiplied with $w_1(n)$ by the second multiplier 607. The output of the second multiplier 607 is input to a third one-sample delay stage 609. The output of the third delay 609 is designated p(n), because it represents the center sample of the window which is used to center the attenuating window at a local maximum, and is input to a third multiplier 611 and the window calculation logic block 621. The sample p(n) is multiplied with $w_2(n)$ by the third multiplier 611. The output of the third multiplier 611 is input to a fourth one-sample delay stage 613. The output of the fourth delay 613 is designated p(n−1), and is input to a fourth multiplier 615 and the window calculation logic block 621. The sample p(n−1) is multiplied with $w_3(n)$ by the fourth multiplier 615. The output of the fourth multiplier 615 is input to a fifth one-sample delay stage 617.

The output of this fifth delay 617 is combined with $w_4(n)$ in a fifth multiplier 619. The default values of the attenuating window, $w_0(n), w_1(n), \ldots, w_{L-1}(n)$, are ones, such that when the windowed-clipping algorithm is not triggered, the input signal samples pass through the windowed-clipping process 511 unaltered except for the delays. Thus, the multipliers 603, 607, 611, 615, and 619 apply the attenuating window to the input signal t(n) resulting in the output signal $t_w(n)$, which is at or below Tclp.

There are two modes of operation of the windowed-clipping algorithm, variable and constant. If $|p(n)|^2$ is greater than Tclp, but less than Tsat (criterion 1), and is determined to be a local maximum (criterion 2), a variable window calculation is triggered. Thus, the two conditions that trigger a variable window calculation are:

$$Tsat>|p(n)|^2>Tclp \qquad 1)$$

and $$|p(n)|^2 \geq |p(n-1)|^2 \text{ and } |p(n)|^2 \geq |p(n+1)|^2. \qquad 2)$$

The equation that defines a variable window is:

$$w_j(n)=1+(c-1)h_j$$

where $$c=\sqrt{Tclp}/|p(n)| \text{ and } j=0, 1, \ldots, L-1.$$

A length L Hanning window, where L is odd, is defined as:

$$h_j=[1-\cos(2\pi j/(L-1))]/2 \text{ for } j=0, 1, \ldots, L-1.$$

If $|p(n)|^2$ is greater than Tsat (criterion 1) and is also determined to be a local maximum (criterion 2), then constant windowed clipping occurs. Thus, the two conditions that trigger a constant window calculation are:

$$|p(n)|^2 \geq Tsat$$

and $$|p(n)|^2 \geq |p(n-1)|^2 \text{ and } |p(n)|^2 \geq |p(n+1)|^2. \qquad 2)$$

Thus, a constant window is defined as $$w_j(n)=1+(c-1)h_j$$

where $$c=\sqrt{Tclp/Tsat} \text{ for } j=0, 1, \ldots, L-1.$$

In the preferred embodiment of U.S. Pat. No. 5,287,387, the windowed-clipping process 511 is performed in a Digital Signal Processor (DSP), such as a DSP56000 available from Motorola, Inc. The sub-channel processors 501, 503, 505, and 507, summer 509, and interpolation and decimation filter 513 are also performed by a DSP, as is known in the art.

When $|p(n)|^2$ is a local maximum, the windowed-clipping algorithm is triggered. Alternatively, the algorithm may be triggered simply when $|p(n)|^2$ is a greater than Tclp, resulting in a different type of low-splatter PAR reduction than with the previously described triggering. A variable window calculation is performed with this alternative form of triggering.

Although $w_j(n)$ for $j=0, 1, \ldots, L-1$ is an inverted Hanning window in the preferred embodiment of U.S. Pat. No. 5,287,387, there are many other windows that will be successful when used in the windowed-clipping algorithm, such as a Hamming window or a Kaiser window.

Windowed clipping provides a less abrupt clipping operation than hard clipping, while affecting fewer input samples than soft clipping, resulting in a smoother clipping operation that splatters less energy out of an allocated frequency band. When Tsat is set to a level less than the absolute maximum peak level, both constant windowed clipping and variable windowed clipping occurs, further reducing the severity of the clipping, and communications on adjacent channels are subject to less interference.

Figure 7:
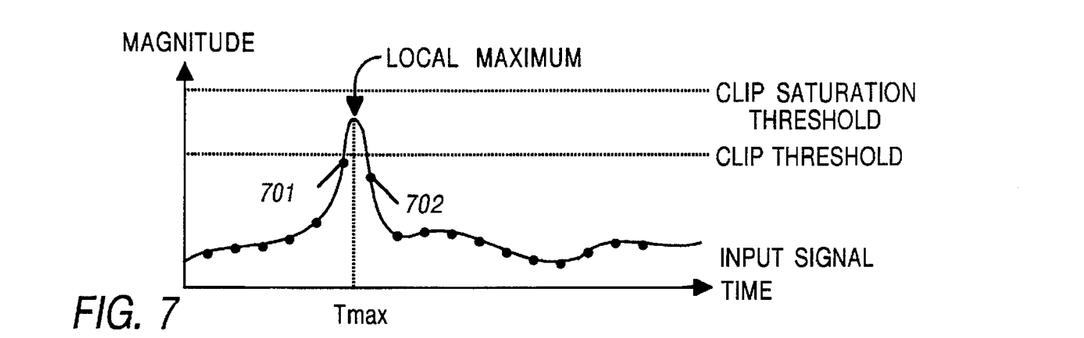
FIG. 7 and FIG. 8 are timing diagrams of an input signal as are known in the art.

Because the windowed-clipping algorithm described above is applied to samples of an input signal, a particular sampling rate must be determined to make these samples. As is known in the art, the higher the sampling rate, the larger the amount of time and energy are required to process these samples, in proportion to the frequency of sampling. Although time and energy are saved as the rate of sampling decreases, the accuracy of the estimate of the original signal diminishes. FIG. 7 shows an input signal with a peak or local maximum above the clip threshold, Tclip. The samples of the signal 701 and 702, however, are not above the clip threshold. Hence, when using the above windowed-clipping algorithm, no windowed-clipping will be performed on this particular peak, because windowed-clipping is performed only when samples fall above the clip threshold. Because a digital-to-analog converter will reconstruct the input signal from the samples into a signal that contains a segment whose magnitude is above the clip threshold, the resultant analog signal will cause splatter problems at the transmitter unless other correction is provided.

Figure 8:
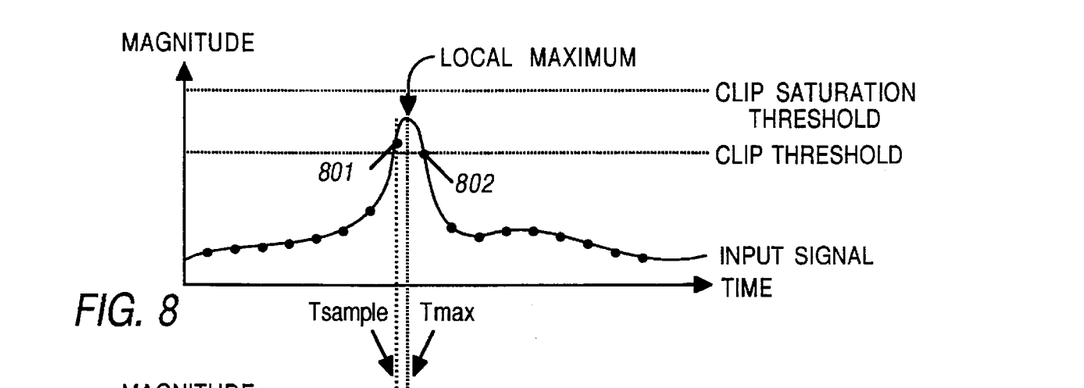
Figure 9:
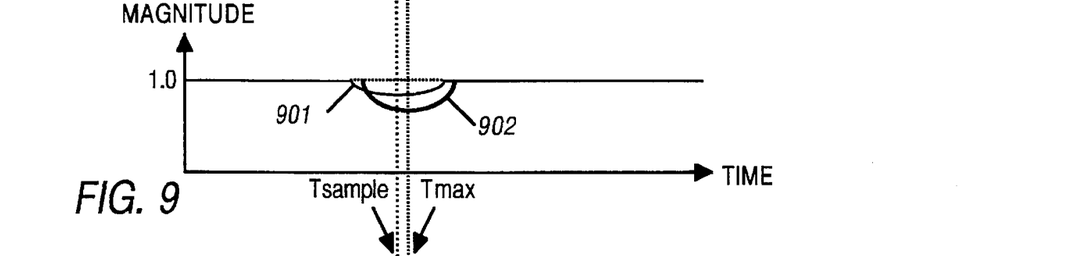
FIG. 9 is a timing diagram of inverted Hanning windows as are known in the art.
Figure 10:
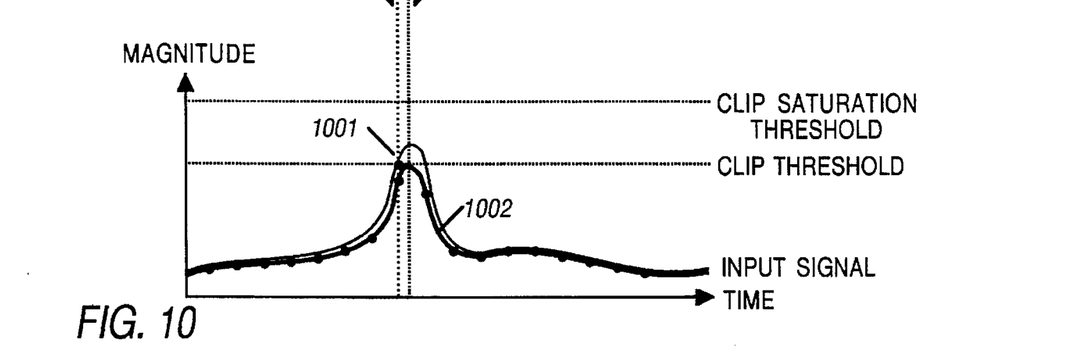
FIG. 10 is a timing diagram of the input signal of FIG. 8 after windowed clipping is performed as is known in the art.

As shown in FIG. 8, a sample for a peak in the input signal is above Tclip, but the magnitude of the local maximum of the peak is greater than the magnitude of the highest-magnitude sample found for this peak. The windowed clipping algorithm involves centering a clipping window at the highest point of the signal. If the highest-magnitude sample 801 is considered the local maximum for the peak shown in FIG. 8, then the attenuating window 901 in FIG. 9 will be centered at the time, Tsample, resulting in a clipped signal 1001 with values above the clip threshold, resulting in splatter. As well as not being attenuated sufficiently, the signal has not been attenuated evenly in time about the center of the peak because the attenuating window was centered at a sample that was not the local maximum of the signal. For the local maximum of FIG. 8 to have been appropriately attenuated, the attenuating window 902 of FIG. 9 should be centered at time Tmax, which is the time of occurrence of the local maximum, and attenuated signal 1002 in FIG. 10 results, showing that the appropriately attenuated signal is no longer above the clip threshold, as is desired for good splatter prevention.

Accordingly, there is a need for an improved windowed-clipping algorithm that can more accurately determine the time of a local maximum of an input signal, and determine when part of an input signal falls above a clip threshold when none of the samples of the input signal are above the clip threshold.

DESCRIPTION OF A PREFERRED EMBODIMENT

The following describes an improved apparatus for and method of determining when and how to apply the windowed-clipping algorithm to various samples of an input signal. The windowed-clipping algorithm provides a low-splatter mechanism of reducing signal peaks by applying an attenuating window to a limited number of signal samples centered at the peak of a signal, which peak is above a clip threshold. An additional threshold, set below the clip threshold in magnitude, is used to determine which peaks should have the windowed-clipping algorithm applied to them. Additional points for the input signal are generated by interpolating additional values around a signal peak at a higher rate than the signal samples were taken. Similarly, the values for the attenuating window are also calculated at the higher rate at which interpolation is performed. The higher-rate attenuating window is aligned to the samples and interpolated values for the input signal, and windowed-clipping is performed.

A method of low-splatter peak-to-average reduction for a linear communication system comprises the step of sampling an input signal at a first rate, yielding a plurality of input samples. When at least one of the plurality of input samples is above a first threshold, a local maximum is determined from among the plurality of input samples. At least one value is interpolated between the local maximum and at least one sample adjacent to the local maximum, wherein the at least one sample is one of the plurality of input samples. The at least one value and the local maximum are compared to determine which has the highest magnitude. The value having the highest magnitude is compared to a second threshold. When the value having the highest magnitude is above the second threshold, an attenuating window is centered at the value having the highest magnitude and applying the attenuating window to at least some of the plurality of input samples.

Alternatively, the method of low-splatter peak-to-average reduction for a linear communication system comprising the step of sampling an input signal at a first rate, yielding a plurality of input samples. At least one value is interpolated between the input samples at a second rate, yielding at least one interpolated sample. It is determined at which of the plurality of input samples or the at least one interpolated sample to align an attenuating window, thereby yielding an aligning sample. A set of local attenuating values separated in time by one over the first rate is determined, yielding the attenuating window. The attenuating window is aligned with the aligning sample. The attenuating window is applied to at least some of the plurality of input samples.

Additionally, a method of low-splatter peak-to-average reduction for a linear communication system may be described as comprising the step of sampling an input signal at a first rate, yielding a plurality of input samples. When at least one of the a plurality of input samples is above a first threshold, a local maximum is determined from among the plurality of input samples. At least one value is interpolated at a second rate between the local maximum and at least one sample adjacent to the local maximum. The at least one value and the local maximum are compared to determine which has the highest magnitude. The value having the highest magnitude is compared to a second threshold. When the value having the highest magnitude is above the second threshold: a set of local attenuating values separated in time by one over the first rate is determined, yielding an attenuating window; the attenuating window is aligned with the value having the highest magnitude; and the attenuating window is applied to at least some of the a plurality of input samples.

Further, the interpolating step may further comprise the step of identifying a first sample of the plurality of input samples, which first sample is adjacent to the local maximum and is one sample earlier in time with respect to the local maximum. A second sample of the plurality of input samples is identified, which second sample is adjacent to the local maximum and is one sample later in time with respect to the local maximum. The magnitude of the first sample is compared with the magnitude of the second sample and which sample has a greater magnitude is found, yielding a higher sample. At least one value is interpolated between the local maximum and the higher sample. The at least one value may include a first value that is interpolated at a first time that is half-way between the local maximum and the higher sample, and a second value that is interpolated at a second time that is half-way between the local maximum and the first time. The at least one value may be interpolated at a time evenly spaced between the local maximum and the at least one sample adjacent to the local maximum. The at least one value may be at least two values that are interpolated at a second rate that is four times the first rate. The aligning step may comprise centering the aligning value with the center of the attenuating window. The attenuating window may be an inverted Hanning window and each method step may be performed in a radio frequency transmitter.

Figure 11:
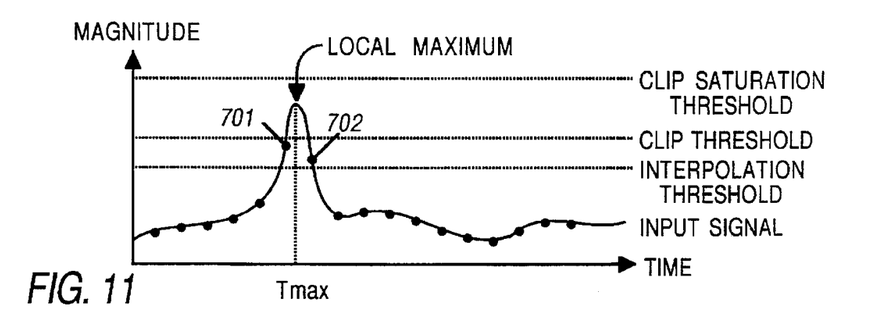
FIG. 11 is a timing diagram of an input signal as compared to an interpolation threshold in accordance with the invention.

FIG. 11 shows the input signal including samples 701 and 702 as was shown in FIG. 7. In order to identify peaks of the input signal that appear above the clip threshold although these samples of the signal are below the clip threshold, another threshold is added, called an interpolation threshold, Tinterp. In the preferred embodiment, the interpolation threshold is one dB below the clip threshold. As can be seen in FIG. 11, samples 701 and 702, while below Tclip, are above Tinterp. In the present invention, when any sample is found to above Tinterp, values between samples above the interpolation threshold are interpolated to find the local maximum of the peak. If this local maximum is above the clipped threshold, then the windowed-clipping process is applied to this peak. This procedure will be further described with respect to the flowcharts in FIG. 12, FIG. 13, and FIG. 15.

Figure 12:
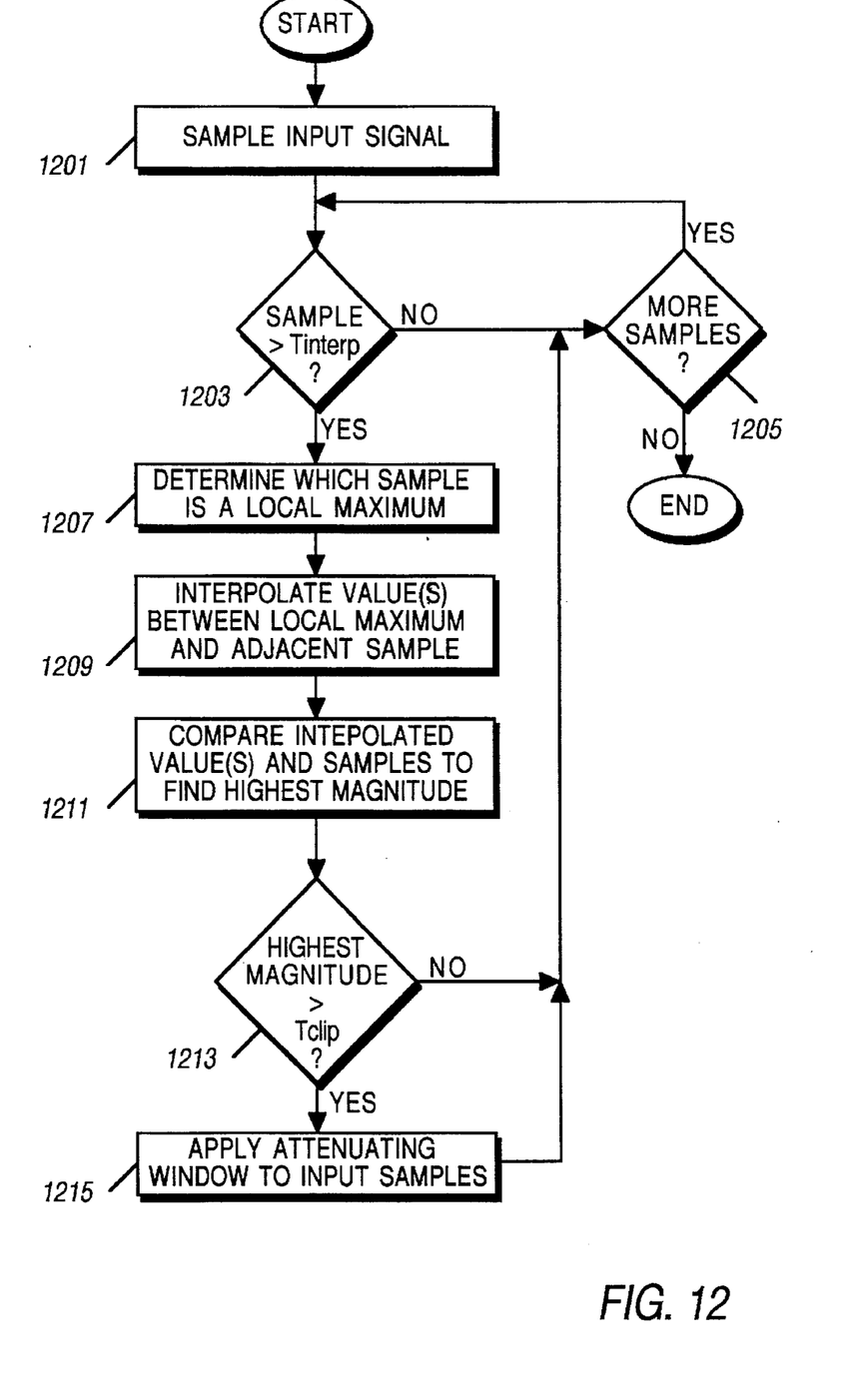
FIG. 12 is a flowchart showing windowed-clipping with interpolation in accordance with the invention.

A flowchart describing application of the windowed-clipping algorithm is shown in FIG. 12. At step 1201, an input signal is sampled. The samples may be generated by either sampling an analog signal or by directly calculating the samples utilizing digital signal processing techniques, as are known in the art. At step 1203, the samples from step 1201 are compared to the interpolation threshold, Tinterp. If the magnitude of the sample is not greater than Tinterp, then the process continues with step 1205, where, if there are more samples, the process continues with step 1203, and if there are no more samples, the process ends. If a sample is greater than Tinterp, the process continues with step 1207, where a determination is made as to which sample is a local maximum, i.e., which of the samples has the greatest magnitude in a given time frame. At step 1209, one or more values are interpolated between the local maximum and at least one adjacent sample. The interpolation process is further described with respect to the flowchart of FIG. 13. At step 1211, the interpolated values and samples are compared to find the highest magnitude from among the interpolated values and samples. The sample or interpolated value with the highest magnitude is compared to the clip threshold, Tclip. If that sample or interpolated value is greater than Tclip at step 1213, then the process continues with step 1215. If the sample or interpolated value with the highest magnitude is not greater than Tclip, then the process continues with step 1205. At step 1215, an attenuating window is applied to the input samples. Application of the attenuating window is further described with respect to the flowchart of FIG. 15.

In the preferred embodiment, the magnitude squared of the input samples is compared to the interpolation threshold and the clip threshold. Although the diagrams, e.g., FIG. 7 through FIG. 11, FIG. 14, and FIG. 16, show MAGNITUDE as the vertical axis, the magnitude squared of the input samples is actually compared to thresholds, which are adjusted to consider the magnitude squared, rather than the simple magnitude. This use of magnitude squared instead of magnitude was made simply to provide easier and fewer calculations, as the magnitude operation requires an additional step of taking a square root, which is a complicated function in a digital signal processor, as would be recognized by one of average skill in the art.

Figure 13:
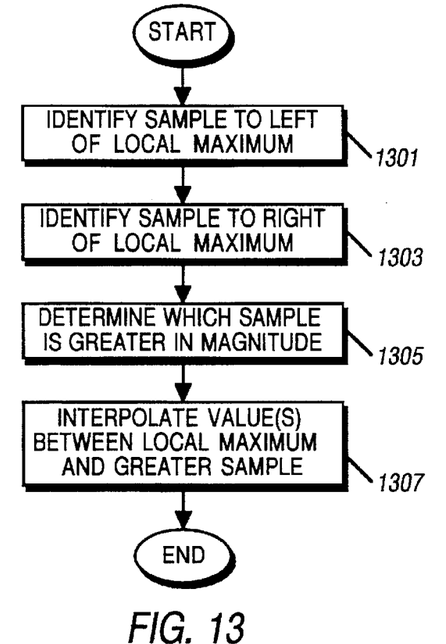
FIG. 13 is a flowchart showing a method of interpolating values between samples of an input signal in accordance with the invention.

A flowchart describing a method of interpolating values between samples of an input signal is shown in FIG. 13. At step 1301, the sample earlier in time with respect to the sample designated as the local maximum in step 1207 of FIG. 12 is identified. At step 1303, the sample later in time with respect to the local maximum is identified. At step 1305, the earlier sample identified in step 1301 and the later sample identified in step 1303 are compared to determine which of these samples is greater in magnitude. At step 1307, one or more values are interpolated between the local maximum and the sample with the greater magnitude as determined in step 1305.

Figure 14:
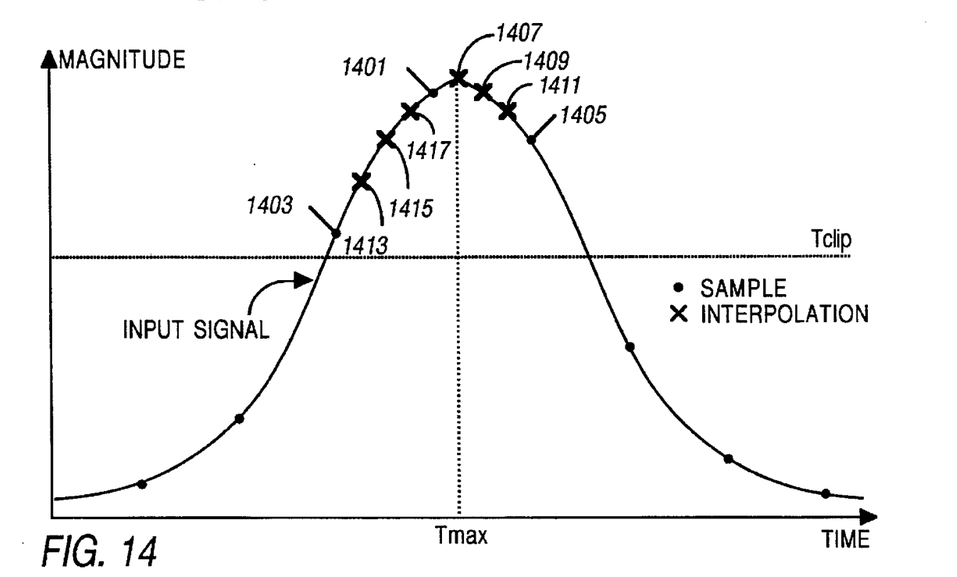
FIG. 14 is a timing diagram of an input signal showing samples and interpolated values in accordance with the invention.

An application of the flowchart of FIG. 13 will now be described by example, using FIG. 14. A figure showing an input signal with various samples (each indicated by a ●) and interpolated values (each indicated by an X) is shown in FIG. 14. Three samples 1401, 1403, and 1405 fall above the clip threshold, Tclip. The first sample 1401 is the local maximum of the samples, as would be determined in step 1207 of FIG. 12. The second sample 1403 is the earlier sample with respect to the local maximum. The third sample 1405 is the later sample with respect to the local maximum 1401. When comparing the earlier sample 1403 with the later sample 1405, the later sample 1405 is greater in magnitude than the earlier sample 1403, as would be determined in step 1305 of FIG. 13. One or more values are then interpolated between the local maximum 1401 and the right sample 1405.

There are many ways to interpolate the values between these samples. As is known in the art, sampling at a higher rate provides more accuracy in determining the precise nature of the signal. Thus, more information is found out about the signal by sampling at twice the rate, and even more information is determined by sampling at three times the rate, or four times the rate, and so forth. In the preferred embodiment, interpolations of values between the samples are provided at four times the sampling rate of the input signal. As a consequence of interpolating at four times the sampling rate, six interpolation samples would be calculated. Three samples would be calculated between the local maximum and an adjacent sample earlier than the local maximum, and three samples would be calculated between the local maximum and an adjacent sample later than the local maximum. In the preferred embodiment, the sampling rate is 36 kilosamples per second, and the interpolation values are determined at 144 kilosamples per second.

Rather than simply interpolating three values 1413, 1415, and 1417 earlier in time with respect to the local maximum 1401 and three values 1407, 1409, and 1411 later in time with respect to the local maximum 1401, for a total of six interpolated values, it would clearly be advantageous to more strategically select a fewer number of samples so as to reduce the number of interpolations and hence the time and energy required to find the actual local maximum of the input signal. Because of the nature of Nyquist sampling of the signal, choosing to interpolate values between the local maximum sample and the next highest sample, eliminates the need to find the three samples on the other side of the local maximum, as more than 99% of the time those three samples will not be the actual local maximum of the input signal. Extrapolating this process further, extensive observation helps to recognize that the actual local maximum of the input signal is much more likely than not to be closer to the local maximum sample 1401 than to the next closest sample 1405 near the local maximum sample 1401. Consequently, in the preferred embodiment, only samples 1407 and 1409 are actually determined, thereby reducing the number of interpolations from 6 to 2, thereby reducing both time and energy in determining the local maximum of the input signal itself. As can be seen from the input signal in FIG. 14, sample 1407 is the peak of the input signal, and occurs at time Tmax. In other instances, the local maximum sample may be the peak of the input signal.

Multi-rate interpolation is accomplished by standard techniques known in the art. Any of the techniques used in the reference "Multirate Digital Signal Processing," by Crochiere and Rabiner, Prentice-Hall, New Jersey, 1983, can be utilized. In the preferred embodiment, polyphase interpolation filters with a tap length per phase of 7 are used. The overall filter is a Nyquist interpolation filter with digital cutoff of $\pi/4$.

Figure 15:
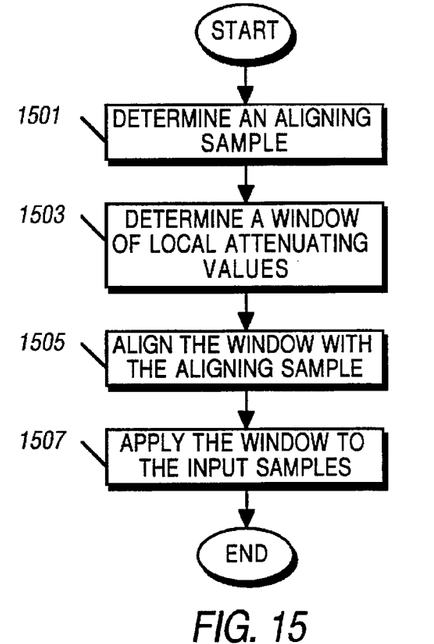
FIG. 15 is a flowchart showing a method of aligning an attenuating window with samples of an input signal in accordance with the invention.
Figure 16:
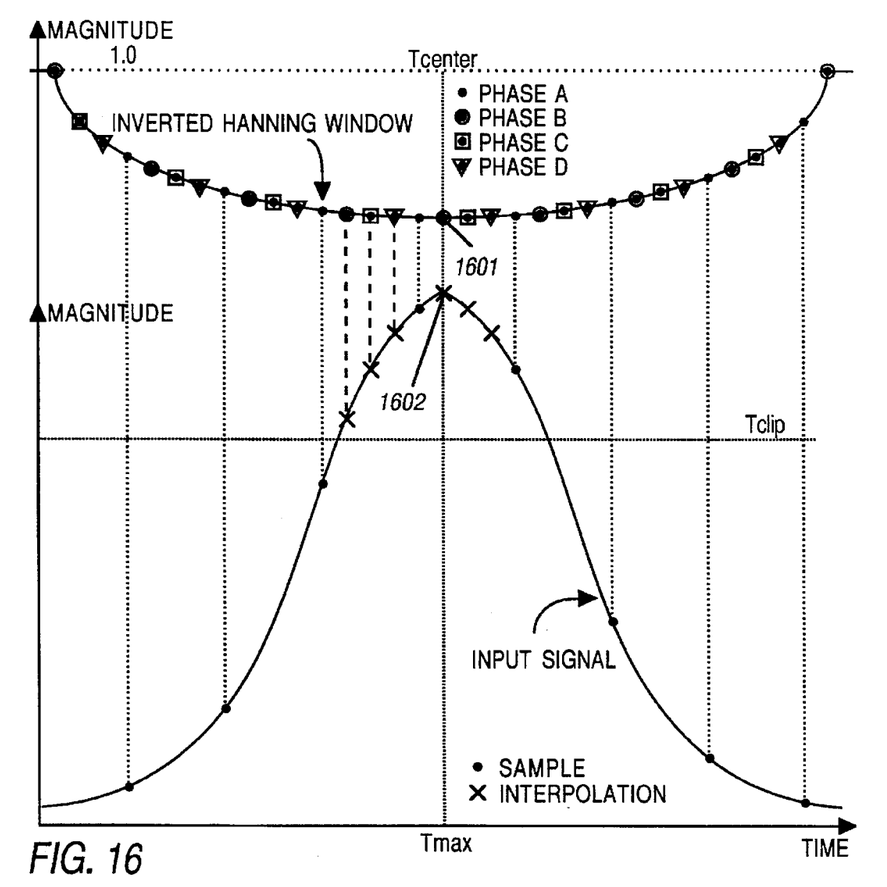
FIG. 16 is a timing diagram of an input signal and an attenuating window in alignment in accordance with the invention.

The flowchart of FIG. 15 shows the application of an attenuating window to input samples, as referred to in step 1215 of FIG. 12. At step 1501, an aligning sample is determined. In the preferred embodiment, the aligning sample is the sample with the greatest magnitude from among the interpolated values (found in step 1209 of FIG. 12) and the input samples (determined in step 1201 of FIG. 12). The aligning sample can be seen by viewing FIG. 16. The bottom half of FIG. 16 shows an input signal with samples, each designated by a ●, and interpolated values, each designated by an X. The maximum (greatest magnitude) of these samples and interpolations is value 1602, which happens to be an interpolation value in this particular figure. In other instances, this maximum value may be an input sample.

At step 1503, a window of local attenuating values is determined. The window of local attenuating values, also known as an attenuating window, is determined in the same way as described in the "Background of the Invention" section above, with the following enhancements. The maximum attenuation of the attenuating window is based on the greatest magnitude value of the input signal, which is the interpolated value 1602 having the greatest magnitude, and is used to reduce this interpolated value 1602 to the threshold Tclip. In the preferred embodiment, an inverted Hanning window is used to provide the attenuating window. A description of how to determine this inverted Hanning window is described in the "Background of the Invention" section above. In the preferred embodiment, the attenuating window is calculated at the higher "sampling" rate at which the interpolation took place. In other words, the inverted Hanning window has attenuating values determined at 144 kilosamples per second. The center of the inverted Hanning window which is designated by sample 1601 in FIG. 16, appears at time Tcenter of the attenuating window.

At step 1505, the attenuating window is aligned with the aligning sample from step 1501. Referring to FIG. 16, the center value 1601 of the attenuating window is lined up in time with the value 1602 of greatest magnitude of the input signal, which occurs at time Tmax. At step 1507, the attenuating window is applied to the input samples. In the preferred embodiment, only those samples which were measured for the input signal are attenuated by the attenuating window. No attenuation is performed on the interpolated values, as only the input samples, or attenuated input samples if clipping was performed, are passed on for further processing and transmission. Thus, the samples of the input signal, as designated by a ● in the lower part of FIG. 16, are attenuated by values of the attenuating window which are designated by a ● as phase A of the attenuating window. Depending on the how the actual samples line up with the peak of the input signal, the attenuating window may line up to the samples at any of four phases of the attenuating window. There are four phases in the preferred embodiment because the interpolated signals are taken at a rate four times that of the sample rate of the input signal (at step 1201). These phases, shown at the top of FIG. 16, are phase A, the values of which are designated by a ●; phase B, designated by a circle around a ●; phase C designated by a square around a ●; or phase D designated by a triangle around a ●.

The method described above is performed within the windowed-clipping process block 511, as shown in FIG. 5, and in conjunction with the apparatus in the block diagram of FIG. 6. The process is performed in a Digital Signal Processor (DSP), such as a DSP56000, available from Motorola, Inc.

The present invention provides for significant additional peak-to-average reduction of communication signals as compared to the performance attained using the previously patented windowed clipping algorithm implementation. The motivation behind the development of this enhanced algorithm is the need for significant additional peak-to-average relief for the power amplification system of communication devices. Reducing the peak-to-average ratio of the communication signals allows the power amplifiers to be operated with less back-off. Reduced back-off yields higher efficiency operation at lower cost, size, and complexity of the power amplification system.

The enhanced algorithm enhances operation of the windowed clipping algorithm in two particular areas. First, due to the relatively high signal bandwidth to sampling frequency ratio of most communication system signals, the locations and magnitudes of signal peaks are difficult to find. Second, also due to the relatively high signal bandwidth to sampling frequency ratio of most communication system signals, some signal peaks are missed entirely. Both of these situations limit the peak reduction effectiveness of the current algorithm. The present invention is an enhanced algorithm that effectively handles these situations.

What is claimed is:

1. A method of low-splatter peak-to-average reduction for a linear communication system, comprising the steps of:

sampling an input signal at a first rate, yielding a plurality of input samples;

determining when at least one of the plurality of input samples is above a first threshold;

when at least one of the plurality of input samples is above a first threshold, determining which of the plurality of input samples is a local maximum;

interpolating at least one value between the local maximum and at least one sample adjacent to the local maximum, wherein the at least one sample is one of the plurality of input samples;

comparing the at least one value and the local maximum to determine which has the highest magnitude;

comparing the value having the highest magnitude to a second threshold; and when the value having the highest magnitude is above the second threshold, centering an attenuating window at the value having the highest magnitude and applying the attenuating window to at least some of the plurality of input samples.

2. The method of claim 1, wherein the step of interpolating further comprises the steps of:

identifying a first sample of the plurality of input samples, which first sample is adjacent to the local maximum and is one sample earlier in time with respect to the local maximum;

identifying a second sample of the plurality of input samples, which second sample is adjacent to the local maximum and is one sample later in time with respect to the local maximum;

comparing the magnitude of the first sample with the magnitude of the second sample and finding which sample has a greater magnitude, yielding a higher sample; and interpolating at least one value between the local maximum and the higher sample.

3. The method of claim 2, wherein a first value is interpolated at a first time that is half-way between the local maximum and the higher sample, and a second value is interpolated at a second time that is half-way between the local maximum and the first time.

4. The method of claim 1, wherein the at least one value is interpolated at a time evenly spaced between the local maximum and the at least one sample adjacent to the local maximum.

5. The method of claim 1, wherein at least two values are interpolated at a second rate that is four times the first rate.

6. The method of claim 1, wherein the attenuating window is an inverted Hanning window.

7. The method of claim 1, wherein each method step is performed in a radio frequency transmitter.

8. A method of low-splatter peak-to-average reduction for a linear communication system, comprising the steps of:

sampling an input signal at a first rate, yielding a plurality of input samples;

interpolating at least one value between the input samples at a second rate, yielding at least one interpolated sample;

determining at which of the plurality of input samples or the at least one interpolated sample to align an attenuating window, thereby yielding an aligning sample;

determining a set of local attenuating values separated in time by one over the first rate, yielding the attenuating window;

aligning the attenuating window with the aligning sample; and applying the attenuating window to at least some of the plurality of input samples.

9. The method of claim 8, wherein the aligning step further comprises centering the aligning value with the center of the attenuating window.

10. The method of claim 8, wherein the attenuating window is an inverted Hanning window.

11. The method of claim 8, wherein each method step is performed in a radio frequency transmitter.

12. A method of low-splatter peak-to-average reduction for a linear communication system, comprising the steps of:

sampling an input signal at a first rate, yielding a plurality of input samples;

determining when at least one of the a plurality of input samples is above a first threshold;

when at least one of the a plurality of input samples is above a first threshold, determining which of the a plurality of input samples is a local maximum;

interpolating at a second rate at least one value between the local maximum and at least one sample adjacent to the local maximum;

comparing the at least one value and the local maximum to determine which has the highest magnitude;

comparing the value having the highest magnitude to a second threshold; and when the value having the highest magnitude is above the second threshold:

determining a set of local attenuating values separated in time by one over the first rate, yielding an attenuating window;

aligning the attenuating window with the value having the highest magnitude; and applying the attenuating window to at least some of the a plurality of input samples.

13. The method of claim 12, wherein the step of interpolating further comprises the steps of:

identifying a first sample of the plurality of input samples, which first sample is adjacent to the local maximum and is one sample earlier in time with respect to the local maximum;

identifying a second sample of the plurality of input samples, which second sample is adjacent to the local maximum and is one sample later in time with respect to the local maximum;

comparing the magnitude of the first sample with the magnitude of the second sample and finding which sample has a greater magnitude, yielding a higher sample; and interpolating at least one value between the local maximum and the higher sample.

14. The method of claim 13, wherein a first value is interpolated at a first time that is half-way between the local maximum and the higher sample, and a second value is interpolated at a second time that is half-way between the local maximum and the first time.

15. The method of claim 12, wherein the at least one value is interpolated at a time evenly spaced between the local maximum and the at least one sample adjacent to the local maximum.

16. The method of claim 12, wherein at least two values are interpolated at a second rate that is four times the first rate.

17. The method of claim 12, wherein the attenuating window is an inverted Hanning window.

18. The method of claim 12, wherein the aligning step further comprises centering the aligning value with the center of the attenuating window.

19. The method of claim 12, wherein each method step is performed in a radio frequency transmitter.

20. The method of claim 12, wherein the step of interpolating further comprises the steps of:

identifying a first sample of the plurality of input samples, which first sample is adjacent to the local maximum and is one sample earlier in time with respect to the local maximum;

identifying a second sample of the plurality of input samples, which second sample is adjacent to the local maximum and is one sample later in time to with respect to the local maximum;

comparing the magnitude of the first sample with the magnitude of the second sample and finding which sample has a greater magnitude, yielding a higher sample; and interpolating two values, a first value and a second value, between the local maximum and the higher sample, wherein the first value is interpolated at a first time that is half-way between the local maximum and the higher sample, and the second value is interpolated at a second time that is half-way between the local maximum and the first time.

* * * * *